United States Patent
Ueda et al.

(10) Patent No.: US 7,889,978 B2
(45) Date of Patent: Feb. 15, 2011

(54) MOTOR CONTROLLER AND ELECTRIC POWER STEERING SYSTEM

(75) Inventors: Takeshi Ueda, Kashiba (JP); Shigeki Nagase, Nabari (JP); Hiroshi Sumasu, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 336 days.

(21) Appl. No.: 12/023,473

(22) Filed: Jan. 31, 2008

(65) Prior Publication Data

US 2008/0191655 A1 Aug. 14, 2008

(30) Foreign Application Priority Data

Feb. 8, 2007 (JP) ............................. 2007-029587
Dec. 12, 2007 (JP) ............................. 2007-320773

(51) Int. Cl.
*H02P 7/285* (2006.01)
*H03D 13/00* (2006.01)

(52) U.S. Cl. ............. 388/812; 318/400.01; 318/400.02; 318/400.09; 318/400.15

(58) Field of Classification Search ................. 388/812; 318/400.01, 400.02, 400.09, 400.15
See application file for complete search history.

(56) References Cited

U.S. PATENT DOCUMENTS

| | | | |
|---|---|---|---|
| 5,482,129 A | 1/1996 | Shimizu | |
| 6,246,197 B1 * | 6/2001 | Kurishige et al. | ........... 318/432 |
| 7,151,354 B2 * | 12/2006 | Yoshinaga et al. | .......... 318/611 |
| 2003/0155879 A1 | 8/2003 | Kifuku et al. | |
| 2006/0219471 A1 | 10/2006 | Hayashi | |

FOREIGN PATENT DOCUMENTS

| | | |
|---|---|---|
| DE | 10 2006 014 618 A1 | 10/2006 |
| JP | 2000-184773 | 6/2000 |
| JP | 2001-187578 | 7/2001 |

OTHER PUBLICATIONS

U.S. Appl. No. 12/811,774, filed Jul. 6, 2010, Ueda, et al.
U.S. Appl. No. 12/812,678, filed Jul. 13, 2010, Ueda, et al.

* cited by examiner

*Primary Examiner*—Bentsu Ro
*Assistant Examiner*—Erick Glass
(74) *Attorney, Agent, or Firm*—Oblon, Spivak, McClelland, Maier & Neustadt, L.L.P.

(57) ABSTRACT

An angle computing section determines an angle of a rotor, and an angular velocity computing section determines angular velocity of the rotor. A command current computing section determines, from a steering torque and vehicle velocity, command currents and taken along d-q axes. An open loop control section determines, from command currents and angular velocity, command voltages taken along the d-q axes in accordance with motor circuit equations. A d-q axis/three-phase conversion section converts the command voltages into command voltages of three phases. A $\phi$ computing section determines the number of armature winding flux linkages included in a motor circuit equation from a q-axis command voltage, the current value detected by a current sensor, and the angular velocity. Circuit resistance including armature winding resistance R included in the motor circuit equation may also be determined by means of the same configuration.

12 Claims, 8 Drawing Sheets

MOTOR CONTROLLER AND ELECTRIC POWER STEERING SYSTEM

BACKGROUND OF THE INVENTION

1. Field of the Invention

The present invention relates to a motor controller and an electric power steering system equipped with the motor controller.

2. Related Art

There has hitherto been known an electric power steering system which provides a steering mechanism of a vehicle with steering assist power by driving an electric motor in accordance with steering torque applied to a handle (a steering wheel) by a driver. Although a brush motor has hitherto been used for an electric motor of the electric power steering system, a brushless motor is recently used, as well, from the viewpoint of an improvement in reliability and durability and a reduction in inertia.

In general, in order to control a torque generated in the motor, the motor controller detects an electric current flowing into the motor, and performs PI control (proportional integration control) in accordance with a difference between an electric current to be supplied to the motor and the detected electric current. In order to detect an electric current of two phases or more, a motor controller for driving a three-phase brushless motor is provided with two or three current sensors.

In connection with the present invention, JP-A-2001-187578 describes determination of a d-axis command voltage and a q-axis command voltage by use of a motor circuit equation. JP-A-2000-184773 describes correction of d-axis command current according to a temperature of the motor.

In a motor controller included in an electric power steering system, a current sensor requires detection of a heavy current of 100 A or greater. The current sensor is large in size and hinders miniaturization of the controller of the electric power steering system. Therefore, in relation to the motor controller included in the electric power steering system, reduction of the current sensor is considered to be a challenge to be met. The cost and power consumption of the motor controller can also be diminished, so long as the current sensor is reduced.

Conceivable methods include a method for diminishing the number of current sensors to one and performing feedback control analogous to related-art feedback control; a method for removing all current sensors and performing open loop control (feed forward control) in accordance with the motor circuit equation.

However, the former method has a drawback of, depending on the rotational position of a rotor of the motor, a single current sensor being unable to detect currents of a plurality of phases required to effect feedback control operation, and there arises a problem of control of the motor being discontinuous. Further, the latter method presents a problem of a failure to correctly drive the motor when a variation has arisen in parameters included in the motor circuit equation.

SUMMARY OF THE INVENTION

Therefore, the present invention aims at providing a motor controller capable of driving a motor with high accuracy even when variations arise in parameters at the time of computation of a motor drive voltage and an electric power steering system equipped with the motor controller.

A first invention is a motor controller for driving a motor characterized by comprising:

a control unit for determining a level of a command voltage used for driving the motor;

a motor drive unit for driving the motor by use of a voltage having the level determined by the control unit;

a current detection unit for detecting an electric current flowing into the motor; and a parameter computing section which determines, from a current value detected by the current detection unit, a parameter used when the level of the command voltage is determined.

A second invention is based on the first invention and further characterized in that the control unit includes an open loop control section which determines the level of the command voltage, from a command current value showing an amount of electric current to be supplied to the motor and angular velocity of a rotor of the motor, in accordance with a motor circuit equation; and that the parameter computing section determines, from the current value detected by the current detection unit, a parameter included in the motor circuit equation.

A third invention is based on the first or second invention and is further characterized in that the parameter computing section determines, from the current value detected by the current detection unit, a number of armature winding flux linkages included in the motor circuit equation.

A fourth invention is based on the first or second invention and is further characterized in that the parameter computing section determines, from the current value detected by the current detection unit, armature winding resistance included in the motor circuit equation.

A fifth invention is based on the first or second invention and is further characterized in that the control unit further includes a feedback control section which subjects a difference between the command current value and the current value detected by the current detection unit to proportional integration, thereby determining a level of the command voltage; and that a command voltage selection section for outputting, in a switching manner, the level of the command voltage determined by the feedback control section and the level of the command voltage determined by the open loop control section.

A sixth invention is based on the fifth invention and is further characterized in that the command voltage selection section outputs the level of the command voltage determined by the feedback control section when the current detection unit is operating normally and which outputs the level of the command voltage determined by the open loop control section when the current detection unit has become broken; and that the parameter computing section determines a parameter included in the motor circuit equation in a period during which the current detection unit is operating normally.

A seventh invention is based on the first or second invention, wherein the parameter computing section determines, from a current value detected by the current detection unit, a number of armature winding flux linkages included in a motor circuit equation when influence of a change in circuit resistance including armature winding resistance included in the motor circuit equation is negligible and the circuit resistance including the armature winding resistance when influence of a change in the number of armature winding flux linkages is negligible.

An eighth invention is based on the fourth invention, wherein the parameter computing section determines a d-axis current detection value of a d-q coordinate system from a current value detected by the current detection unit, and determines the circuit resistance including the armature winding resistance from the d-axis current detection value when the determined d-axis current detection value is not zero.

A ninth invention is based on the first or second invention, wherein the control unit includes a command current value computing section for determining a command current value showing an amount of current to be supplied to the motor; and the parameter computing section determines a calorific value from the command current value determined by the command current value computing section when the current detection unit does not detect any current value, and determines circuit resistance including armature winding resistance included in the motor circuit equation from the determined calorific value.

A tenth invention is based on the third invention, wherein the control unit comprises a dimension conversion section for computing a current torque constant by means of dimensionally converting the number of armature winding flux linkages determined by the parameter computing section; and a command current value computing section that receives the current torque constant from the dimensional conversion section and that determines a command current value showing an amount of electric current supplied to the motor equivalent to a value determined by dividing a torque, which serves as a target torque to arise in the motor, by the current torque constant.

An eleventh invention is based on the first or second invention, there is further provided a voltage detection unit for detecting a voltage corresponding to the voltage applied to the motor, wherein the motor drive unit comprises a switching circuit that has a plurality of switching elements and that supplies the motor with a current as a result of the plurality of switching elements being turning on or off; and a motor voltage determination section that turns on or off the plurality of switching elements by use of a voltage of the level determined by the control unit and a voltage detected by the voltage detection unit, wherein the voltage detection unit measures a voltage between a point on a path from one end of the switching circuit connected to a positive side of a power source for driving the motor to the positive side of the power source and another point on a path from the other end of the switching circuit, which is connected to the negative side of the power source, to the negative side of the power source A twelfth invention is based on anyone of the first through eleventh inventions, wherein the motor drive unit includes a switching circuit that has a plurality of switching elements and that supplies the motor with a current; and the current detection unit is provided in number of one between the switching circuit and the power source.

A thirteenth invention is directed to an electric power steering system having the motor controller of any one of the first through twelfth inventions.

According to the first invention, a parameter used when the level of a command voltage is determined is determined from a current value detected by the current detection unit. Therefore, even when variations arise in the parameter for reasons of variations in production or temperature changes, a motor is driven with high accuracy, and a desired motor output can be obtained.

According to the second invention, in a case where open loop control is performed in accordance with a motor circuit equation, even when variations arise in a parameter included in the motor circuit equation for reasons of variations in production or temperature changes, the motor is driven with high accuracy, and a desired motor output can be obtained.

According to the third invention, even when variations arise in the number of armature winding flux linkages used when the level of a command voltage is determined for reasons of variations in production or temperature changes, a motor is driven with high accuracy, and a desired motor output can be obtained.

According to the fourth invention, even when variations arise in armature winding resistance used when the level of a command voltage is determined for reasons of variations in production or temperature changes, a motor is driven with high accuracy, and a desired motor output can be obtained.

According to the fifth invention, even when feedback control or open loop control is performed by switching between feedback control and open loop control, a motor is driven with high accuracy, and a desired motor output can be obtained.

According to the sixth invention, feedback control is performed in a period during which the current detection unit is operating normally, and a motor can be driven with high accuracy. Further, when the current detection unit has become broken and feedback control cannot be performed, open loop control is performed by use of a parameter determined in a period during which feedback control is performed, whereby a motor is driven with high accuracy continuously, to thus become able to acquire a desired motor output.

According to the seventh invention, when influence of a change in one of circuit resistance including armature winding resistance included in the motor circuit equation or the number of armature winding flux linkages is negligible, the parameter computing section determines the other value. Accordingly, both values can be accurately determined.

According to the eighth invention, the circuit resistance including the armature winding resistance is determined from the d-axis current detection value when the d-axis current detection value is not zero. Hence, the circuit resistance including the armature winding resistance can be accurately determined without being affected by the influence of the number of armature winding flux linkages.

According to the ninth invention, when the current detection unit does not detect any current value, a calorific value is determined from the command current value, whereby the circuit resistance including armature winding resistance is determined. Hence, even when detection of a current is impossible, circuit resistance including armature winding resistance can be determined at all times. Further, in a case where circuit resistance cannot be determined at all times, torque variations suddenly arising at a point in time when determination of the circuit resistance has become possible can be reduced.

According to the tenth invention, the command current value is determined by use of the current torque constant computed by the dimension conversion section. Hence, the command current involves an individual difference unique to each system. Further, a current value in place of a predetermined fixed value can be used for a torque constant that varies in accordance with a temperature change. Consequently, occurrence of unstable control, which would otherwise be caused when required assist torque cannot be acquired even by a command current, can be prevented.

According to the eleventh invention, a voltage applied to the motor is detected by the voltage detection unit. Hence, a voltage serving as a reference for turning on or off (typically a duty ratio of the PWM signal) the plurality of switching elements included in the switching circuit can be accurately acquired. Hence, control can be accurately performed in a stable manner.

According to the twelfth invention, a reduction in size, cost, and power consumption of the motor controller can be achieved by reducing the current detection unit.

According to the thirteenth invention, even when a parameter used for determining the level of the command voltage fluctuates for reasons of variations in production or temperature changes, a motor can be driven with high accuracy, and a desired motor output can be acquired. Hence, smooth steering assistance becomes feasible.

DETAILED DESCRIPTION OF THE PREFERRED EMBODIMENTS

Figure 1:
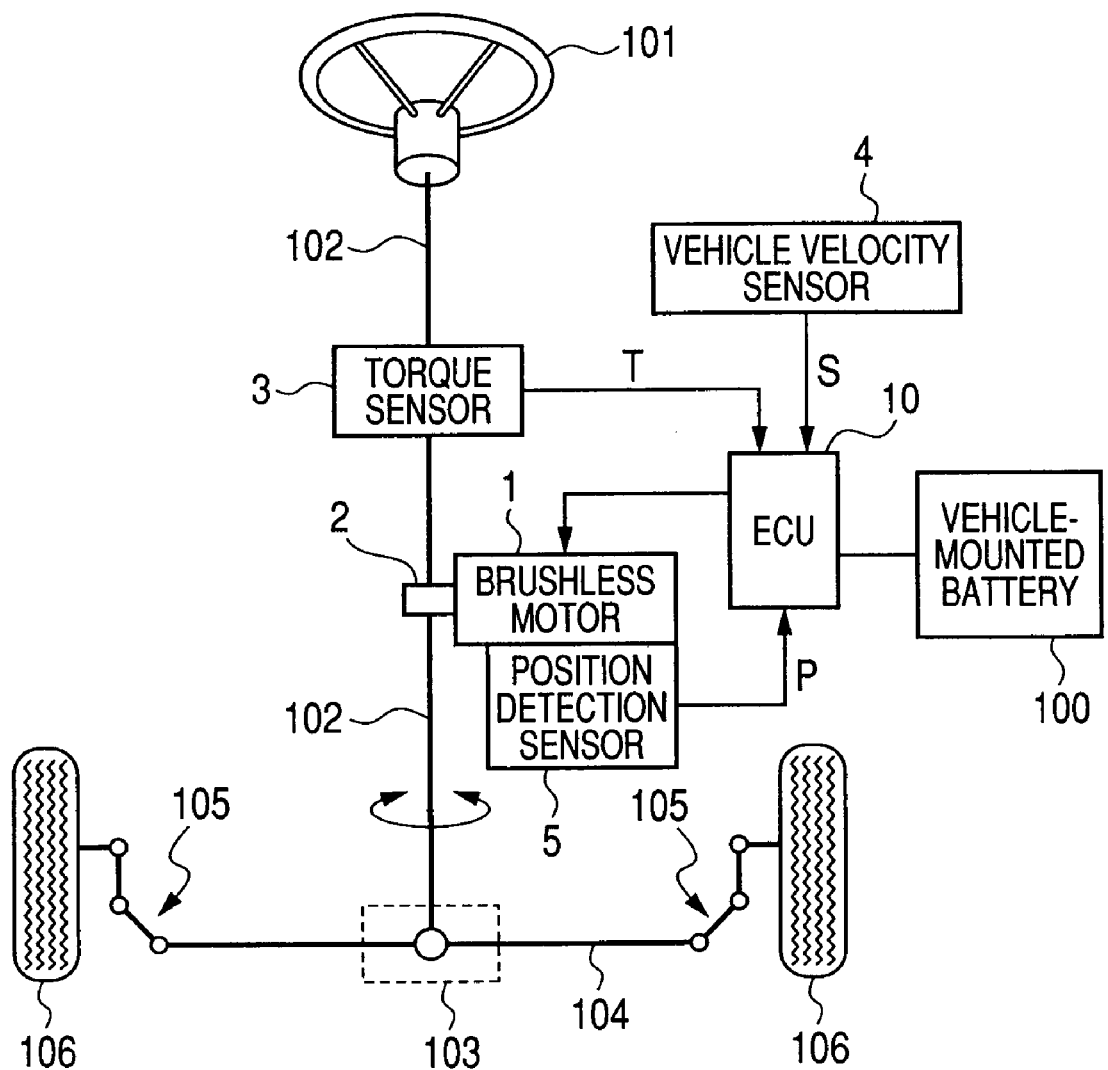
FIG. 1 is a block diagram showing the configuration of an electric power steering system of an embodiment of the present invention.

FIG. 1 is a schematic diagram showing the configuration of an electric power steering system of an embodiment of the present invention along with the configuration of a vehicle related to the electric power steering system. The power steering system shown in FIG. 1 is an electric power steering system of a column assist type including a brushless motor 1, a reducer 2, a torque sensor 3, vehicle velocity sensor 4, a position detection sensor 5, and an electronic control unit (hereinafter called an "ECU") 10.

As shown in FIG. 1, a handle (a steering wheel) 101 is fixed to one end of the steering shaft 102, and the other end of the steering shaft 102 is coupled to a rack shaft 104 by way of a rack-and-pinion mechanism 103. Both ends of the rack shaft 104 are joined to wheels 106 by way of coupling members 105, each of which consists of a tie rod and a steering knuckle arm. When a driver rotates the handle 101, the steering shaft 102 is rotated, and the rack shaft 104 performs reciprocal movement along with rotation of the steering shaft. In conjunction with reciprocal movement of the rack shaft 104, the direction of the wheels 106 is changed.

In order to lighten a burden on the driver, the electric power steering system performs steering assist operation provided below. The torque sensor 3 detects a steering torque T applied to the steering shaft 102 by means of operation of the handle 101. The vehicle velocity sensor 4 detects vehicle velocity S. The position detection sensor 5 detects a rotational position P of a rotor of the brushless motor 1. The position detection sensor 5 is formed from, for example, a resolver.

The ECU 10 is supplied with power from a vehicle-mounted battery 100 and drives the brushless motor 1 in accordance with the steering torque T, the vehicle velocity S, and the rotational position P. When being driven by the ECU 10, the brushless motor 1 generates steering assist power. The reducer 2 is interposed between the brushless motor 1 and the steering shaft 102. The steering assist power generated by the brushless motor 1 acts so as to rotate the steering shaft 102 by way of the reducer 2.

As a result, the steering shaft 102 is rotated by means of the steering torque applied to the handle 101 and the steering assist power generated by the brushless motor 1. Thus, the electric power steering system performs steering assistance by providing a steering mechanism of the vehicle with the steering assist power generated by the brushless motor 1.

The electric power steering system of the embodiment of the present invention is characterized by a controller (a motor controller) which drives the brushless motor 1. The motor controller included in each of electric power steering systems of embodiments will be described hereunder.

First Embodiment

Figure 2:
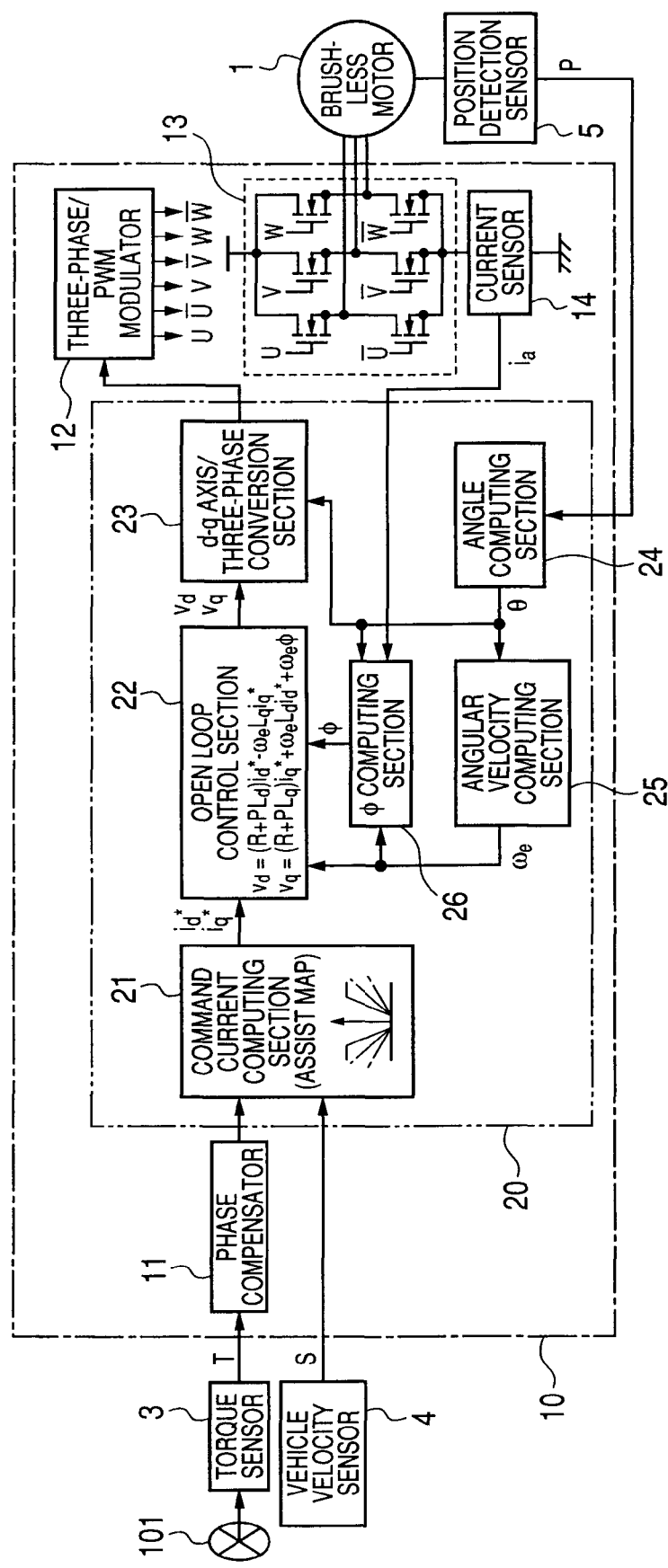
FIG. 2 is a block diagram showing the configuration of a motor controller of a first embodiment of the present invention.

FIG. 2 is a block diagram showing the configuration of a motor controller of a first embodiment of the present invention. The motor controller shown in FIG. 2 is built by use of the ECU 10 and drives the brushless motor 1 having three-phase windings (not shown) of a "u" phase, a "v" phase, and a "w" phase. The ECU 10 has a phase compensator 11, a microcomputer 20, a three-phase/PWM (Pulse-Width Modulation) modulator 12, a motor drive circuit 13, and a current sensor 14.

The steering torque T output from the torque sensor 3, the vehicle velocity S output from the vehicle velocity sensor 4, and the rotational position P output from the position detection sensor 5 are input to the ECU 10. The phase compensator 11 compensates for the phase of the steering torque T. The microcomputer 20 acts as control unit which determines the level of a command voltage used for driving the brushless motor 1. Detailed function of the microcomputer 20 will be described later.

The three-phase/PWM modulator 12 and the motor drive circuit 13 are formed from hardware (circuitry) and act as motor drive unit for driving the brushless motor 1 by use of a voltage having the level determined by the microcomputer 20. The three-phase PWM modulator 12 generates three types of PWM signals (i.e., U, V, and W shown in FIG. 2) having a duty ratio conforming to the level of three-phase voltage determined by the microcomputer 20. The motor drive circuit 13 is an inverter circuit of a PWM voltage type including six MOS-FETs (Metal Oxide Semiconductor Field Effect Transistors) as switching elements. The six MOS-FETs are controlled by means of three types of PWM signals and negative signals thereof. Conduction of the MOS-FETs is controlled by means of the PWM signal, whereby three-phase drive currents (a U-phase current, a V-phase current, and a W-phase current) are supplied to the brushless motor 1. As mentioned above, the motor drive circuit 13 has a plurality of switching elements and acts as a switching circuit for supplying the brushless motor 1 with an electric current.

The current sensor 14 acts as current detection unit for detecting an electric current flowing into the brushless motor 1. The current sensor 14 is formed from, for example, a resistor and a hall element. Only one current sensor is provided between the motor drive circuit 13 and the power source. In the embodiment shown in FIG. 2, the current sensor 14 is interposed between the motor drive circuit 13 and a negative side (aground) of the power source. However, the current sensor 14 may also be provided between the motor drive circuit 13 and a positive side of the power source.

In the middle of rotation of the brushless motor 1, a current value detected by the current sensor 14 changes in accordance with the PWM signal. A single period of the PWM signal includes two times: namely, when the current sensor 14 detects a drive current of one phase and when the current sensor 14 detects a sum of drive currents of two phases. The sum of drive currents of three phases comes to zero, and hence a drive current of remaining one phase can be determined from the sum of the drive currents of two phases. Consequently, in a period during which the brushless motor 1 is rotating, drive currents of three phases can be detected by use of one current sensor 14. A current value ia detected by the current sensor 14 is input to the microcomputer 20.

The microcomputer 20 acts as a command current computing section 21, an open loop control section 22, a d-q axis/three-phase conversion section 23, an angle computing section 24, an angular velocity computing section 25, and a φ computing section 26 (a parameter computing section of the invention) by executing a program stored in memory (not shown) incorporated in the ECU 10. As shown below, the microcomputer 20 determines, from a command current value showing an amount of current to be supplied to the brushless motor 1and the angular velocity of the rotor of the brushless motor 1, the level of a voltage (hereinafter called a "command voltage") to be provided to the motor drive circuit 13 in accordance with the motor circuit equation. The microcomputer 20 does not use the current value detected by the current sensor 14 when the level of the command voltage is determined but uses the current value when parameters included in the motor circuit equation are determined.

Figure 3:
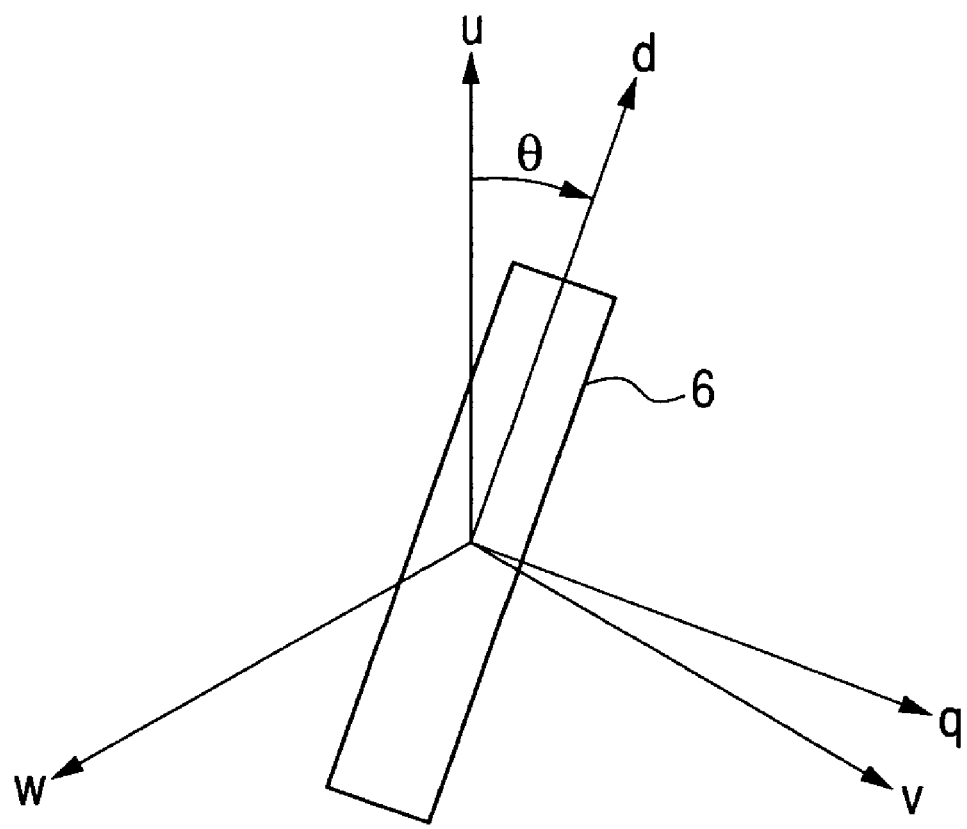
FIG. 3 is a view showing three-phase AC coordinates and a d-q coordinate of a three-phase brushless motor.

The angle computing section 24 determines a rotation angle (hereinafter called an "angle θ") of a rotor of the brushless motor 1 from the rotation position P detected by the position detection sensor 5. The angular velocity computing section 25 determines angular velocity $\omega_e$ of the rotor of the brushless motor 1 from the angle θ. As shown in FIG. 3, when a "u" axis, a "v" axis, and a "w" axis are set in connection with the brushless motor 1 and when a "d" axis and a "q" axis are set in connection with the rotor 6 of the brushless motor 1, an angle made between the "u" axis and the "d" axis comes to the angle θ.

The command current computing section 21 determines a d-axis current (hereinafter called a "d-axis command current $i_d^*$") and a q-axis current (hereinafter called a "q-axis command current $i_q^*$") to be supplied to the brushless motor 1 from the phase-compensated steering torque T (a signal output from the phase compensator 11) and the vehicle velocity S. In more detail, the command current computing section 21 includes a table (hereinafter called an "assist map") where the steering torque T and the command currents are associated with each other while the vehicle velocity S is taken as a parameter, and determines command currents by reference to the assist map. When the steering torque of certain magnitude is provided, there can be determined the d-axis command current $i_d^*$ and the q-axis command current $i_q^*$ which are to be supplied to the brushless motor 1 in order to generate steering assist force of appropriate level conforming to the strength by use of the assist map.

The q-axis command current $i_q^*$ determined by the command current computing section 21 is a current value with a sign, and the sign designates the direction of steering assistance. For instance, when the sign is positive, steering assistance for effecting a right turn is performed. When the sign is negative, steering assistance for effecting a left turn is performed. Moreover, the d-axis command current $i_d^*$ is typically set to zero.

The open loop control section 22 determines a d-axis voltage (hereinafter called a "d-axis command voltage $v_d$") and a q-axis voltage (hereinafter called a "q-axis command voltage $v_q$") which are to be supplied to the brushless motor 1 from the d-axis command current $i_d^*$, the q-axis command current $i_q^*$, and the angular velocity $\omega_e$. The d-axis command voltage $v_d$ and the q-axis command voltage $v_q$ are computed by use of motor circuit equations (1) and (2) provided below:

$$V_d = (R + PL_d)i_d^* - \omega_e L_q i_q^* \quad (1)$$

$$V_q = (R + PL_q)i_q^* + \omega_e L_d i_d^* + \omega_e \phi \quad (2)$$

In Equations (1) and (2), $v_d$ is a d-axis command voltage; $v_q$ is a q-axis command voltage; $i_d^*$ is a d-axis command current; $i_q^*$ is a q-axis command current; $\omega_e$ is angular velocity of a rotor; R is circuit resistance including armature winding resistance; $L_d$ is d-axis self inductance; $L_q$ is q-axis self inductance; φ is a √(3/2) multiple of the maximum number of U-phase, V-phase, and W-phase armature winding flux linkages; and P is a differential operator. Of these parameters, R, $L_d$, $L_q$, and φ are handled as known parameters. The circuit resistance includes wiring resistance between the brushless motor 1 and the ECU 10, resistance and wiring resistance of the motor drive circuit 13 in the ECU 10, and the like. The same also applies to an embodiment provided below.

The d-q axis/three-phase conversion section 23 converts the d-axis command voltage $v_d$ and the q-axis command voltage $v_q$, which are determined by the open loop control section 22, into command voltages taken along axes of three-phase AC coordinates. In more detail, the d-q axis/three-phase conversion section 23 determines the u-phase command voltage $V_u$, a v-phase command voltage $V_v$, and a w-phase command voltage $V_w$ from the d-axis command voltage $v_d$ and the q-axis command voltage $v_q$, by use of Equations (3) through (5) provided below.

$$V_u = \sqrt{(2/3)} \times \{v_d \times \cos\theta - v_q \times \sin\theta\} \quad (3)$$

$$V_v = \sqrt{(2/3)} \times \{v_d \times \cos(\theta - 2\pi/3) - v_q \times \sin(\theta - 2\pi/3)\} \quad (4)$$

$$V_w = -V_u - V_v \quad (5)$$

The angle θ included in Equations (3) and (4) is determined by the angle computing section 24.

As mentioned above, the microcomputer 20 performs processing for determining the command currents $i_d^*$ and $i_q^*$ taken along axes of a d-q coordinate, processing for determining the command voltages $v_d$ and $v_q$ taken along the axes of the d-q coordinate in accordance with the motor circuit equations, and processing for converting the command voltages $v_d$ and $v_q$ into command voltages $V_u$, $V_v$, and $V_w$ of three phases. In accordance with the command voltages $V_u$, $V_v$, and $V_w$ of three phases determined by the microcomputer 20, the three-phase/PWM modulator 12 outputs PWM signals of three types. As a result, electric currents assuming the shape of a sinusoidal waveform conforming to the command voltages of respective phases flow into the three phase windings of the brushless motor 1, whereupon the rotor of the brushless motor 1 rotate. Along with rotation, a torque conforming to the electric current flowing through the brushless motor 1 is generated in a rotary shaft of the brushless motor 1. The thus-generated torque is used for steering assistance.

The current value $i_a$ detected by the current sensor 14, the angle θ computed by the angle computing section 24, and the angular velocity $\omega_e$ computed by the angular velocity computing section 25 are input to the φ computing section 26. First, the φ computing section 26 determines a u-phase current (hereinafter called a "u-phase detection current $i_u$") and a v-phase current (hereinafter called a "v-phase detection current $i_v$") flowing through the brushless motor 1 from the current value $i_a$, and converts these currents into current values taken along the axes of the d-q coordinate. In more detail, the φ computing section 26 determines the d-axis detection current $i_d$ and the q-axis detection current $i_q$ from the u-phase detection current $i_u$ and the v-phase detection current $i_v$ by use of Equations (6) and (7) provided below.

$$i_d = \sqrt{2} \times \{I_v \times \sin\theta - I_u \times \sin(\theta - 2\pi/3)\} \quad (6)$$

$$i_q = \sqrt{2} \times \{I_v \times \cos\theta - I_u \times \cos(\theta - 2\pi/3)\} \quad (7)$$

The angle θ included in Equations (6) and (7) is determined by the angle computing section 24.

Next, when $\omega_e \neq 0$ stands, the φ computing section 26 determines the number of armature winding flux linkages φ included in Equation (2) from the q-axis command voltage $v_q$, the d-axis detection current $i_d$, the q-axis detection current $i_q$, and the angular velocity $\omega_e$, by use of Equation (8a) provided below.

$$\phi = \{v_q - (R + PL_q)i_q - \omega_e L_d i_d\}/\omega_e \quad (8a)$$

Equation (8a) is derived by substituting the d-axis detection current $i_d$ and the q-axis detection current $i_q$ into the d-axis command current $i_d^*$ and the q-axis command current $i_q^*$ in Equation (2) and solving the equation in connection with φ.

The φ computing section 26 outputs the thus-determined φ value to the open loop control section 22. When determining the q-axis command voltage $v_q$ by use of Equation (2), the open loop control section 22 uses the φ value computed by the φ computing section 26. Thus, the microcomputer 20 determines the number of armature winding flux linkages φ in the motor circuit equations, and uses the φ value when determining the q-axis command voltage $v_q$.

For the sake of simplifying computation, the φ computing section 26 may also use Equation (8b) or (8c) provided below in lieu of Equation (8a).

$$\phi = (v_q - Ri_q - \omega_e L_d i_d)/\omega_e \quad (8b)$$

$$\phi = (v_q - Ri_q)/\omega_e \quad (8c)$$

Equation (8b) corresponds to Equation (8a) from which a differential term is omitted, and Equation (8c) corresponds to Equation (8b) from which terms including $i_d$ are omitted.

The φ computing section 26 may also determine a φ value at arbitrary timing, so long as $\omega_e \neq 0$ stands. The φ computing section 26 may also determine a φ value at, for example, a predetermined time interval; determine a φ value only once after commencement of driving of the brushless motor 1; or determine a φ value when a status change, such as a temperature change, has arisen. Moreover, since an error is likely to arise in the φ value determined when $\omega_e$ is close to zero, the φ computing section 26 may also determine a φ value only when $\omega_e$ is assumed a predetermined threshold value or more.

As mentioned above, the motor controller of the present embodiment determines a command voltage from a command current value and the angular velocity of the rotor in accordance with the motor circuit equations, through open loop control, and determines φ included in the motor circuit equations from the current value detected by the current sensor. When determining the command voltage, the motor controller uses the φ value.

Therefore, according to the motor controller of the present embodiment, even when a variation arises in the φ value included in the motor circuit equations for reasons of variations in production or temperature changes, the φ value is determined from the current value detected by the current sensor, to thus drive the brushless motor with high accuracy, so that a desired motor output can be obtained.

The motor controller of the present embodiment is provided with only one current sensor. Therefore, according to the motor controller of the present embodiment, miniaturization, cost reduction, and a reduction in power consumption of the motor controller can be achieved by reducing the number of current sensors.

Since the motor controller of the present embodiment performs open loop control, control of the motor does not become discontinuous when compared with the case of a motor controller that performs feedback control by use of one current sensor. Therefore, the motor controller of the present embodiment can reduce sound or vibration.

Second Embodiment

Figure 4:
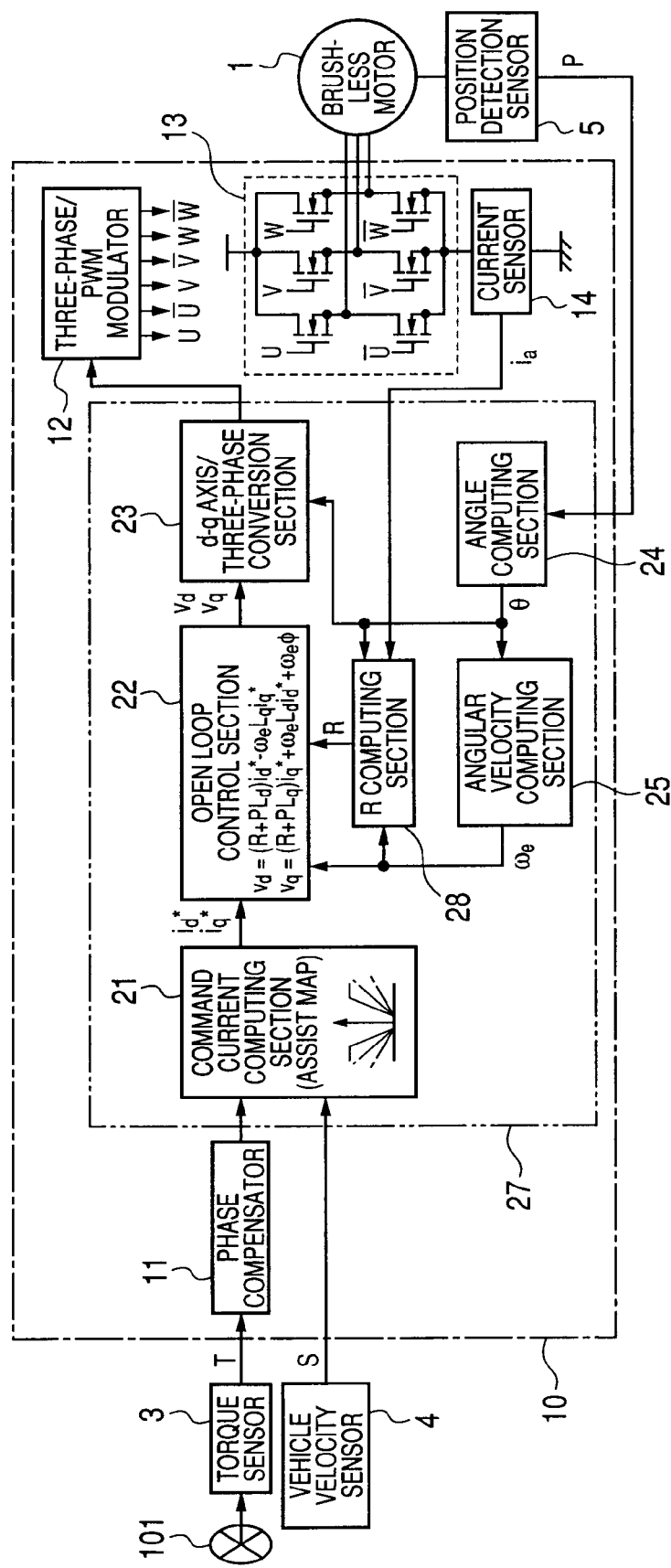
FIG. 4 is a block diagram showing the configuration of a motor controller of a second embodiment of the present invention.

FIG. 4 is a block diagram showing the configuration of a motor controller of a second embodiment of the present invention. In the motor controller of the first embodiment, the motor controller shown in FIG. 4 has a microcomputer 27 including an R computing section 28 (a parameter computing section of the invention) in place of the microcomputer 20 including the φ computing section 26. Of constituent elements of embodiments provided below, elements which are identical with those of the previously-described embodiment are assigned the same reference numerals, and their explanations are omitted.

As is the case with the φ computing section 26, the R computing section 28 is supplied with, as an input, the current value $i_a$ detected by the current sensor 14, the angle θ computed by the angle computing section 24, and the angular velocity $\omega_e$ computed by the angular velocity computing section 25. The R computing section 28 determines the u-phase detection current $i_u$ and the v-phase detection current $i_v$ from the current value $i_a$ and converts the currents into current values in the d-q coordinate by use of Equations (6) and (7).

When $i_q \neq 0$ stands, the R computing section 28 determines armature winding resistance R included in Equations (1) and (2) from the q-axis command voltage $v_q$, the d-axis detection current $i_d$, the q-axis detection current $i_q$, and the angular velocity $\omega_e$, by use of Equation (9a) provided below.

$$R = (v_q - PL_q i_q - \omega_e L_d i_d - \omega_e \phi)/i_q \quad (9a)$$

Equation (9a) is derived by substituting the d-axis detection current $i_d$ and the q-axis detection current $i_q$ into the d-axis command current $i_d^*$ and the q-axis command current $i_q^*$ in Equation (2) and solving the equation in connection with R.

The R computing section 28 outputs the thus-determined R value to the open loop control section 22. When determining the d-axis command voltage $v_d$ and the q-axis command voltage $v_q$ by use of Equations (1) and (2), the open loop control section 22 uses the R value computed by the R computing section 28. Thus, the microcomputer 27 determines the number of circuit resistance R including armature winding resistance included in the motor circuit equations, and uses the R value when determining the d-axis command voltage $v_d$ and the q-axis command voltage $v_q$.

For the sake of simplifying computation, the R computing section 28 may also use Equation (9b) or (9c) provided below in lieu of Equation (9a).

$$R=(v_q-\omega_e L_d i_d-\omega_e \phi)/i_e \quad (9b)$$

$$R=(v_q-\omega_e \phi)/i_q \quad (9c)$$

Equation (9b) corresponds to Equation (9a) from which a differential term is omitted, and Equation (9c) corresponds to Equation (9a) from which terms including $i_d$ are omitted.

The R computing section 28 may also determine an R value at arbitrary timing, so long as $i_q \neq 0$ stands. The R computing section 28 may also determine an R value at, for example, a predetermined time interval; determine an R value only once after commencement of driving of the brushless motor 1; or determine an R value when a status change, such as a temperature change, has arisen. Moreover, since an error is likely to arise in the R value determined when $i_q$ is close to zero, the R computing section 28 may also determine an R value only when $i_q$ is assumed a predetermined threshold value or more.

As mentioned above, the motor controller of the present embodiment determines a command voltage from a command current value and the angular velocity of the rotor in accordance with the motor circuit equations, through open loop control, and determines an R value included in the motor circuit equations from the current value detected by the current sensor. When determining the command voltage, the motor controller uses the R value.

Therefore, according to the motor controller of the present embodiment, even when a variation arises in the R value included in the motor circuit equations for reasons of variations in production or temperature changes, as in the case of the motor controller of the first embodiment, the R value is determined from the current value detected by the current sensor, to thus drive the brushless motor with high accuracy, so that a desired motor output can be obtained.

Third Embodiment

Figure 5:
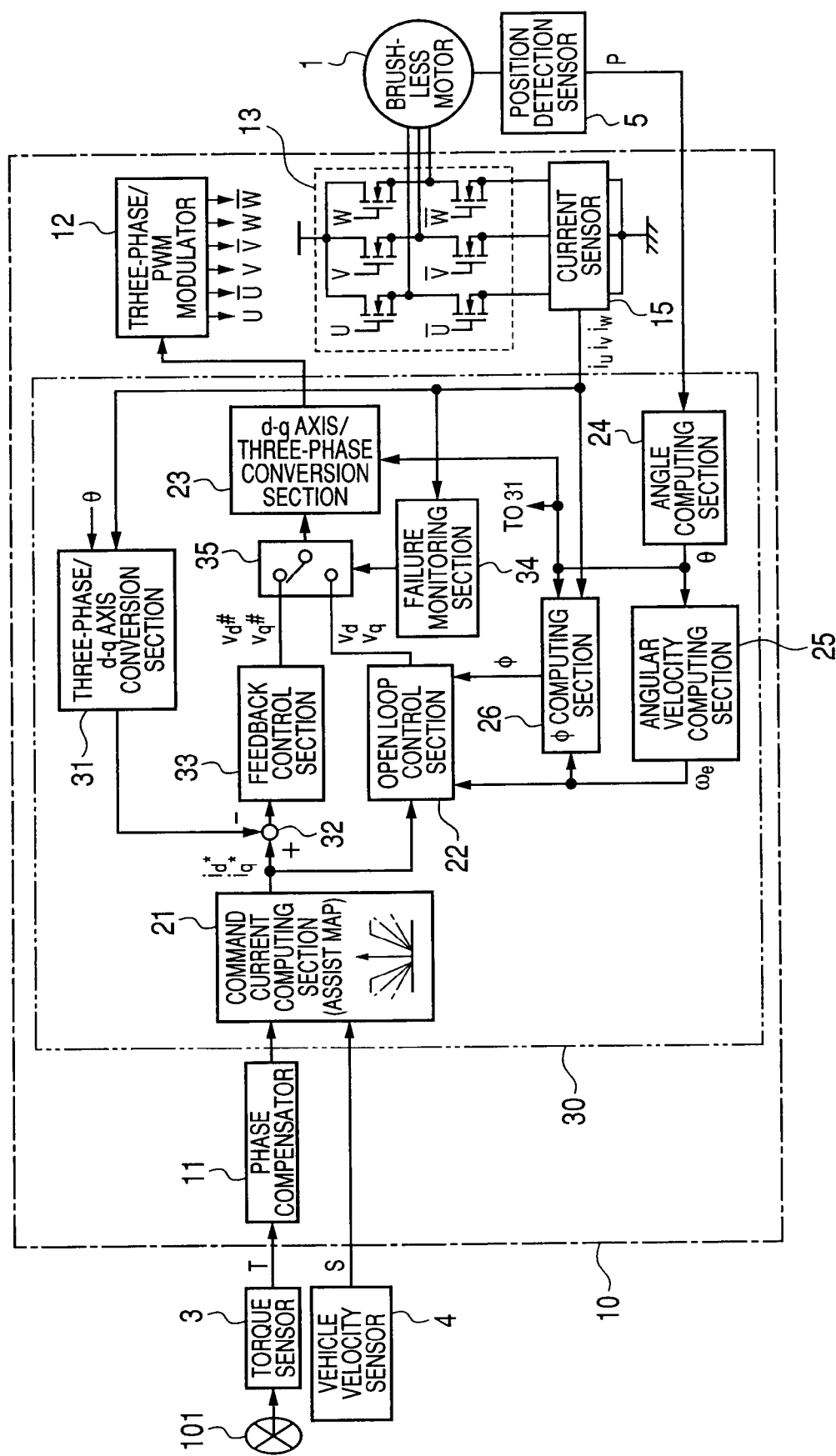
FIG. 5 is a block diagram showing the configuration of a motor controller of a third embodiment of the present invention.

FIG. 5 is a block diagram showing the configuration of a motor controller of a third embodiment of the present invention. The motor controller shown in FIG. 5 corresponds to the motor controller of the first embodiment in which the microcomputer 20 and the current sensor 14 are replaced with a microcomputer 30 and a current sensor 15. When the current sensor 15 operates normally, the motor controller performs feedback control operation. When the current sensor 15 has become broken, the motor controller performs open loop control.

The current sensor 15 is provided in number of one on a path through which drive currents of three phases supplied to the brushless motor 1 flow, and detects drive currents of three phases individually. The current values of three phases (hereinafter called a u-phase detection current $i_u$, the v-phase detection current $i_v$, and the w-phase detection current $i_w$) detected by the current sensor 15 are input to the microcomputer 30.

When compared with the microcomputer 20, the microcomputer 30 is additionally provided with a three-phase/d-q axis conversion section 31, a subtraction section 32, a feedback control section 33, a failure monitoring section 34, and a command voltage selection section 35. The three-phase/d-q axis conversion section 31 determines the d-axis detection current $i_d$ and the q-axis detection current $i_q$ from the u-phase detection current $i_u$ and the v-phase detection current $i_v$ detected by the current sensor 15, by use of Equations (6) and (7).

The subtraction section 32 determines a deviation $E_d$ between the d-axis command current $i_d{}^*$ and the d-axis detection current $i_d$ and a deviation $E_q$ between the q-axis command current $i_q{}^*$ and the q-axis detection current $i_q$. The feedback control section 33 subjects the deviations $E_d$ and $E_q$ to proportional integration indicated by Equations (10) and (11) provided below, thereby determining a d-axis command voltage $v_d\#$ and a q-axis command voltage $v_q\#$:

$$v_d\# = K \times \{E_d + (1/T)\int E_d \cdot dt\} \quad (10)$$

$$V_q\# = K \times \{E_q + (1/T)\int E_q \cdot dt\} \quad (11)$$

In Equations (10) and (11), K is a proportional gain constant; and T is an integration time.

The failure monitoring section 34 determines whether or not the current values of three phases detected by the current sensor 15 fall within a normal range, thereby determining whether or the current sensor 15 is operating normally or anomalously. When all of the current values of three phases fall within the normal range, the failure monitoring section 34 determines the current sensor 15 to be normal. When a current value of one phase or more falls outside the normal range, the failure monitoring section 34 determines the current sensor 15 to be faulty. The failure monitoring section 34 outputs a control signal showing a result of the determination.

When the failure monitoring section 34 has determined the current sensor to be normal, the command voltage selection section 35 outputs the d-axis command voltage $v_d\#$ and the q-axis command voltage $v_q\#$ determined by the feedback control section 33. When the failure monitoring section 34 has determined the current sensor to be faulty, the command voltage selection section outputs the d-axis command voltage $v_d$ and the q-axis command voltage $v_q$ determined by the open loop control section 22.

When the current sensor 15 is operating normally, the failure monitoring section 34 determines the current sensor to be normal, and the command voltage selection section 35 selects an output from the feedback control section 33. At this time, the command current computing section 21, the d-q axis/three-phase conversion section 23, the angle computing section 24, the three-phase/d-q axis conversion section 31, the subtraction section 32, and the feedback control section 33 operate, thereby performing feedback control. In addition, the angular velocity computing section 25 and the φ computing section 26 also operate in a period during which the current sensor 15 is operating normally. In a period during which the current sensor 15 is operating normally, the φ computing section 26 determines the number of armature winding flux linkages φ included in Equation (2) by use of Equation (8a) or the like.

Subsequently, when the current sensor 15 has become broken, the failure monitoring section 34 determines the current sensor to be faulty, and the command voltage selection section 35 selects an output from the open loop control section 22. At this time, the command current computing section 21, the open loop control section 22, the d-q axis/three-phase conversion section 23, and the angle computing section 24 operate, thereby performing open loop control. The open loop control section 22 determines the d-axis command voltage $v_d$ and the q-axis command voltage $v_q$ by use of the φ value determined in the period during which the current sensor 15 is operating normally.

As mentioned above, when the current sensor is operating normally, the motor controller of the present embodiment subjects a difference between the command current value and the current value detected by the current sensor to proportional integration, thereby determining a command voltage. When the current sensor has become broken, open loop control is performed on the basis of the command current value and the angular velocity of the rotor in accordance with the motor circuit equations, thereby determining a command voltage. Further, when open loop control is performed, there is used the φ value (the number of armature winding flux linkages φ) determined in the period during which the current sensor has been operating normally.

Therefore, according to the motor controller of the present embodiment, in the period during which the current sensor is operating normally, feedback control is performed, and the brushless motor can be driven with high accuracy. Again, when the current sensor becomes broken and when feedback control cannot be performed, open loop control is performed by use of the number of armature winding flux linkages φ determined in the period during which feedback control has been performed, so that the brushless motor can be driven with high accuracy and that a desired motor output can be produced.

Figure 6:
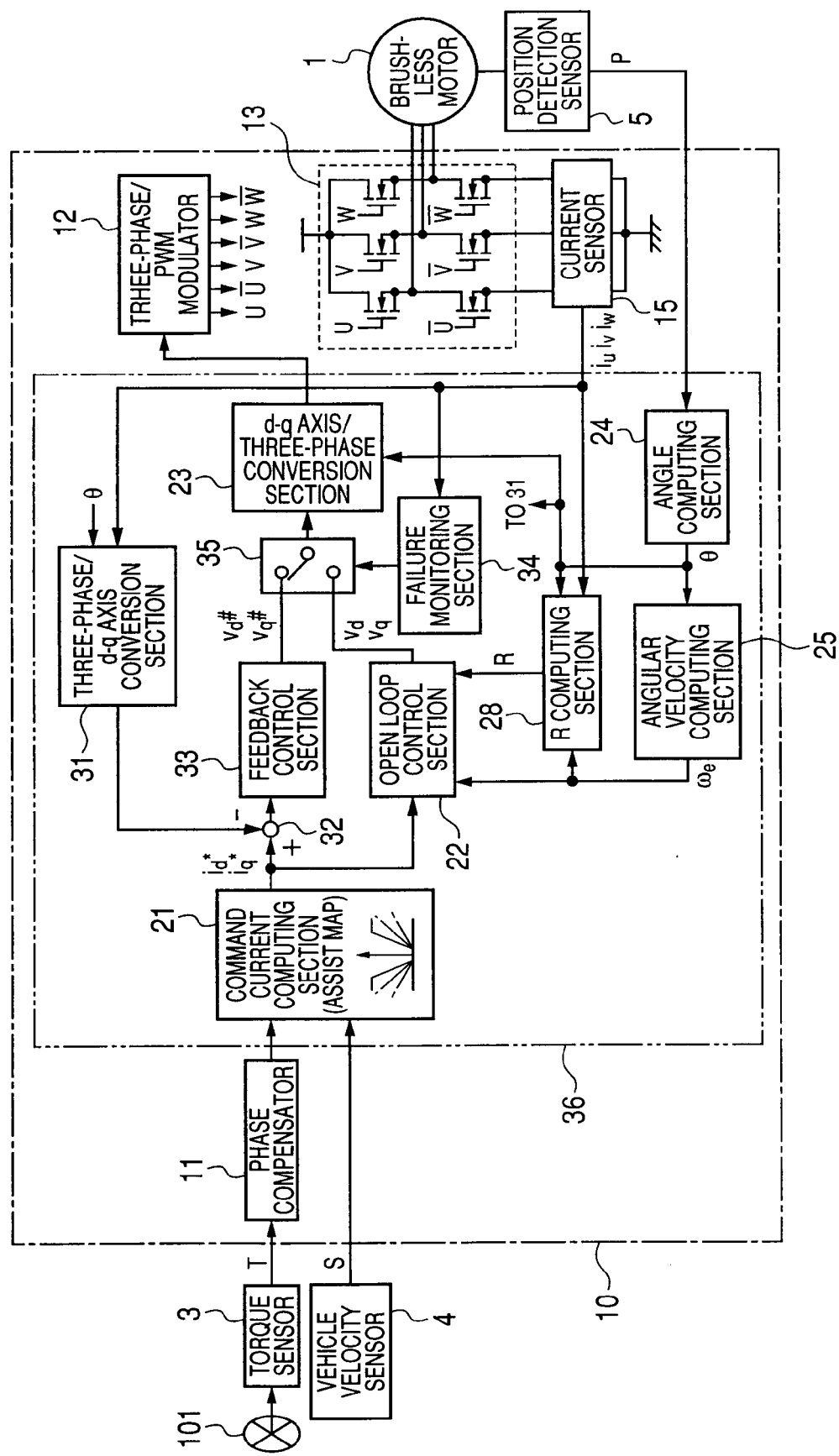
FIG. 6 is a block diagram showing the configuration of a motor controller of a modification of the third embodiment of the present invention.

In relation to the motor controller shown in FIG. 5, a modification shown in FIG. 6 can be configured. The motor controller shown in FIG. 6 corresponds to the motor controller shown in FIG. 5 in which the microcomputer 30 including the φ computing section 26 is replaced with a microcomputer 36 including the R computing section 28. Operation of the motor controller shown in FIG. 6 is evident from the descriptions provided thus far, and hence its explanation is omitted. The motor controller shown in FIG. 6 yields the same advantage as that yielded by the motor controller shown in FIG. 5.

In the motor controllers of the embodiments, $L_d$ and $L_q$ included in Equation (1) may also be determined from the command current or the detection current through computation, or an identical value may also be used for $L_d$ and $L_q$ (in the case of, for example, a cylindrical motor). In order to individually detect drive currents of respective phases, the motor controllers of the first and second embodiments may also be provided with a plurality of current sensors. Further, the motor controller of the third embodiment may also switch between feedback control and open loop control in accordance with a determination except those mentioned above (e.g., a driver's choice).

As mentioned above, since the motor controllers of the respective embodiments of the present invention determine parameters used when the level of the command voltage is determined from a current value detected by the current sensor, the motor can be driven with high accuracy even when variations arise in the parameters for reasons of variations in production or temperature changes, so that a desired motor output can be obtained. Therefore, the electric power steering system having the motor controller enables smooth steering assistance.

The present invention can be applied not only to the electric power steering system of column assist type but also to an electric power steering system of pinion assist type and an electric power steering system of rack assist type. Further, the present invention can also be applied to a motor controller other than the electric power steering system.

Modifications of the Respective Embodiments

In the first embodiment, when the angular velocity $\omega_e$ is equal to or greater than a predetermined threshold value, the φ computing section 26 may also determine the φ value. In the second embodiment, as long as the q-axis detection current $i_q$ is equal to or greater than a predetermined threshold value, the R computing section 28 may also determine an R value. However, both the φ value and the R value cannot be simultaneously determined in any of the embodiments. Moreover, a method for solving a simultaneous equation by means of a relationship between both values determined at different points in time also presents a problem of a large change not arising in a detected current. Hence, the method is not practical. For these reasons, extreme difficulty is encountered incorrectly determining both values at all times.

Figure 7:
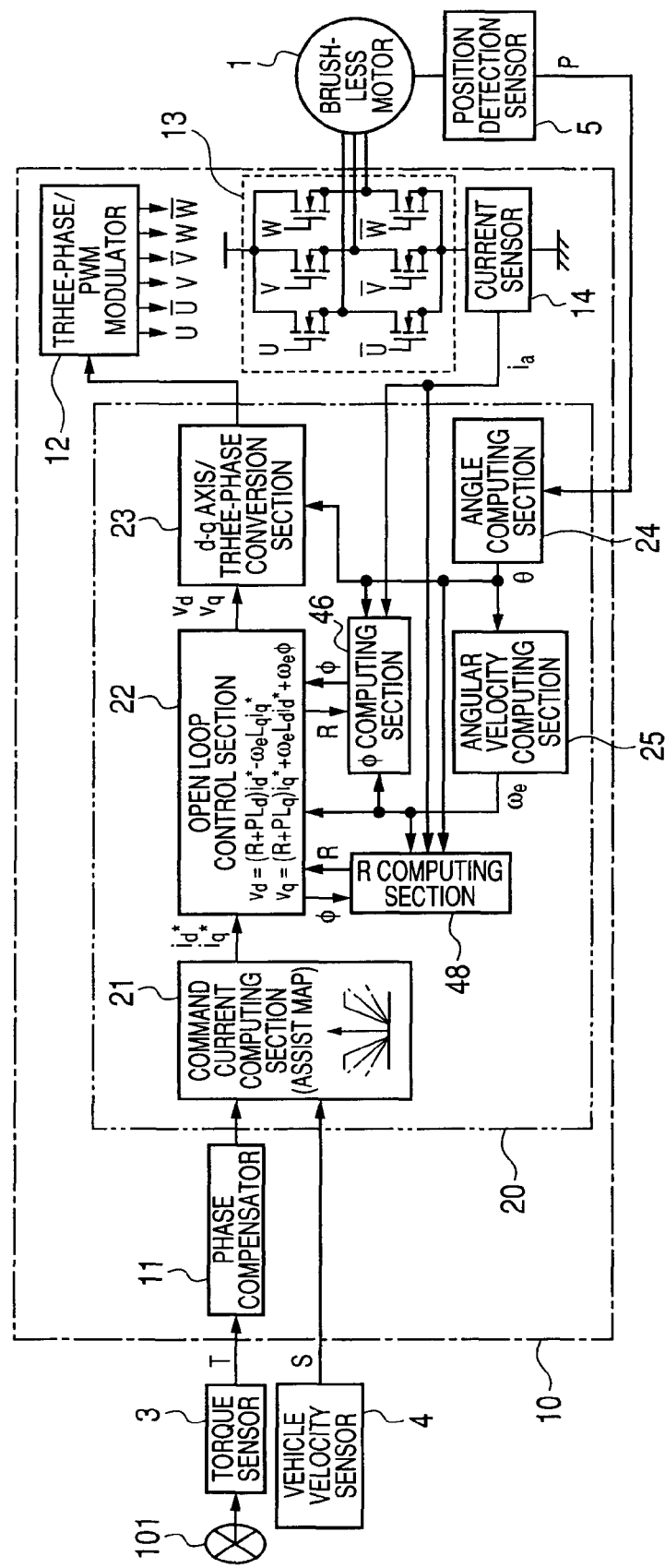
FIG. 7 is a block diagram showing an example configuration of a motor controller of the modification of the present invention.

Therefore, as shown in FIG. 7, a φ computing section 46 equivalent to the φ computing section 26 of the embodiment and an R computing section 48 equivalent to the R computing section 28 of the embodiment are simultaneously provided in a present modification. When an influence stemming from a change in one of both values is small, an influence on a computed value induced by the change in the one value can be disregarded, and hence operation for computing the other value is performed. As a result, both values can be computed accurately. A conceivable method for computing the values includes the following three methods.

First, a first computing method includes computing a φ value at an area where the q-axis current is small and computing an R value at an area where the q-axis current is large. As can be seen by reference to Eqs. (8a) to (8c), the R value is inevitably multiplied by the q-axis detection current $i_q$. Hence, when the q-axis detection current $i_q$ is small, the φ value can be accurately determined regardless of the magnitude of the R value. For instance, in a case where the angular velocity $\omega_e$ is not zero, when the q-axis detection current $i_q$ is less than a predetermined threshold value (e.g., less than 10 A), the φ computing section 46 computes the φ value through use of any of Eqs. (8a) to (8c). When the q-axis detection current $i_q$ is equal to or greater than the threshold value (e.g., 10 A or more), the R computing section 48 computes an R value through use of any of Eqs. (9a) to (9c), whereupon the φ value and the R value can be accurately determined, respectively.

The q-axis command current $i_q^*$, a q-axis estimated current, and the like may also be used in lieu of the q-axis detection current $i_q$ to be compared with the threshold value. Moreover, since a value determined when the angular velocity $\omega_e$ is close to zero is prone to an error, the φ value and the R value may also be determined only when the angular velocity $\omega_e$ is equal to or greater than a predetermined threshold value.

In the vicinity of the threshold value, even when a nominal change has occurred in the q-axis detection current $i_q$, the change arises so as to switch between the case where the φ value is computed and the case where the R value is computed. Therefore, when computation of a φ value and computation of an R value are alternately iterated within a short period of time, there are cases where the φ value and the R value deviate from accurate values. Accordingly, (typically) two threshold values may be set so as not to switch, within a short period of time, between the case where the φ value is computed and the case where the R value is computed and so as to impart a hysteresis characteristic in place of one threshold value.

For instance, when the q-axis detection current $i_q$ is less than the second threshold value (e.g., less than 15 A), the φ computing section 46 computes a φ value. However, when the R computing section 48 is computing an R value at that point in time, the φ computing section 46 computes a φ value only when the q-axis detection current $i_q$ is less than the first threshold value (e.g., less than 5 A) that is smaller than the second threshold value, and the R computing section 48 computes an R value so far. Herein, the φ computing section 46 receives the R value computed by the R computing section 48 by way of the open loop control section 22, thereby determining whether or not the R computing section 48 is computing an R value.

Conversely, when the q-axis detection current $i_q$ is equal to or greater than the first threshold value, the R computing section 48 computes an R value. However, when the φ computing section 46 is computing a φ value at that point in time, the R computing section 48 computes an R value only when the q-axis detection current $i_q$ is equal to or greater than the second threshold value, and the φ computing section 46 computes a φ value thus far. Herein, the R computing section 48 receives the φ value computed by the φ computing section 46 by way of the open loop control section 22, thereby determining whether or not the φ computing section 46 is computing a φ value.

The case where a φ value is computed and the case where an R value is computed can be unswitched until the q-axis detection current $i_q$ changes from the first threshold value to the second threshold value or in reverse order, by means of setting a threshold value so as to assume a hysteresis characteristic as mentioned above. Thereby, the φ value and the R value can be accurately determined, respectively.

Specific limitations are not imposed on a configuration for imparting such a hysteresis characteristic. For instance, there may also be provided a switching section that controls the φ computing section 46 and the R computing section 48 in such a way that only either the φ computing section 46 or the R computing section 48 operates while assuming a hysteresis characteristic. Alternatively, the φ computing section 46 and the R computing section 48 may individually determine whether or not another constituent element is computing a value.

Next, as a second computing method, an R value is computed at an area where the angular velocity of the rotor is small, and a φ value is computed at an area where angular velocity is large. As can be seen from Eqs. (9a) to (9c), a φ value is inevitably multiplied by the angular velocity $\omega_e$. Hence, when the angular velocity $\omega_e$ is small, the R value can be accurately determined regardless of the magnitude of the φ value. For instance, in a case where the q-axis detection current $i_q$ is not zero, when the angular velocity $\omega_e$ is less than the threshold value (e.g., less than 100 rpm), the R computing section 48 computes an R value in accordance with any of Eqs. (9a) to (9c). When the angular velocity $\omega_e$ is equal to or greater than the threshold value (e.g., 100 rpm or greater), the φ value computing section 46 computes a φ value in accordance with any of Eqs. (8a) to (8c), whereupon the φ value and the R value can be accurately determined, respectively.

The threshold value may also be reset so as to come to an appropriate value conforming to a change in source voltage. Moreover, since a value determined when the q-axis detection current $i_q$ is close to zero is prone to an error, the φ value and the R value may also be determined only when the q-axis detection current $i_q$ is equal to or greater than a predetermined threshold value.

As with the first computing method, under the second computing method a slight change in angular velocity $\omega_e$ in the vicinity of the threshold value changes between the case where a φ value is computed and the case where an R value is computed. When computation of a φ value and computation of an R value are alternately iterated within a short period of time, there are cases where the φ value and the R value deviate from accurate values. Accordingly, two threshold values may similarly be set so as to impart a hysteresis characteristic in place of one threshold value. For instance, when the angular velocity $\omega_e$ is less than the second threshold value (e.g., less than 150 rpm), the R computing section 48 computes an R value. However, when the φ computing section 46 is computing a φ value at that point in time, the R computing section 48 computes an R value only when the angular velocity $\omega_e$ is less than the first threshold value (e.g., less than 50 rpm) that is smaller than the second threshold value, and the φ computing section 46 computes a φ value thus far. Conversely, when the angular velocity $\omega_e$ is equal to or greater than the first threshold value, the φ computing section 46 computes a φ value. When the R computing section 48 is computing an R value at that point in time, the φ computing section 46 computes a φ value only when the angular velocity $\omega_e$ is equal to or greater than the second threshold value, and the R computing section 48 computes an R value thus far. The φ value and the R value can be accurately determined, respectively, by means of setting the threshold value so as to have a hysteresis characteristic as mentioned above.

Finally, as a third computing method, a term $(R+PL_q)i_q$ of an R value and a term $\omega_e\phi$ of a φ value in an equation where the d-axis detection current $i_d$ and the q-axis detection current $i_q$ are substituted into the d-axis command current $i_d^*$ and the q-axis command current $i_q^*$ of Eq. (2) are compared with each other. In an area where the term of the R value is greater, the R value is computed. In an area where the term of the φ value is greater, the φ value is computed. The reason for this is that one value is smaller than the other value, the greater value is easy to determine more accurately. Consequently, when an inequality of $(R+PL_q)i_q \geq \omega_e\phi$ is fulfilled, the R computing section 48 computes an R value. When an inequality of $(R+PL_q)i_q < \omega_e\phi$ is fulfilled, the φ computing section 46 computes a φ value, whereupon the φ value and the R value can be accurately determined, respectively. The R computing section 48 is herein assumed to receive a φ value from the open loop section 22, and the φ value computing section 46 is herein assumed to receive an R value from the open loop section 22.

Likewise, when even under the third computing method computation of a φ value and computation of an R value are alternately iterated within a short period of time, there are cases where the φ value and the R value deviate from accurate values. Accordingly, an inequality, such as that provided below, may also be similarly set so as to impart a hysteresis characteristic. For instance, when an inequality of $(R+PL_q)i_q\cdot\alpha \geq \omega_e\phi$ is fulfilled on the assumption that a ratio coefficient α is an appropriate positive real number and a ratio coefficient β is an appropriate positive real number that is greater than α, the R computing section 48 computes an R value. When the φ computing section 46 is computing a φ value at that point in time, the R computing section 48 computes an R value only when an inequality of $(R+PL_q)i_q\cdot\beta \geq \omega_e\phi$ is fulfilled, and the φ computing section 46 computes a φ value thus far. Conversely, when an inequality of $(R+PL_q)i_q\cdot\beta < \omega_e\phi$ is fulfilled, the φ computing section 46 computes a φ value. However, when the R computing section 48 is computing an R value at that point in time, the φ computing section 46 computes a φ value only when an inequality of $(R+PL_q)i_q\cdot\alpha < \omega_e\phi$ is fulfilled, and the R computing section 48 computes an R value thus far. The φ value and the R value can be accurately determined respectively, by means of setting the predetermined ratio coefficients α and β in the inequality so as to have a hysteresis characteristic. A predetermined positive real number may also be added so as to have a hysteresis characteristic in place of the configuration for multiplying the left side of the inequality by the ratio coefficients α and β.

Under the first to third computing methods, the φ computing section 46 and the R computing section 48 may also determine a φ value and an R value at arbitrary timing, so long as the foregoing conditions are satisfied. For instance, the φ computing section 46 and the R computing section 48 may determine a φ value and an R value at a predetermined time interval; may determine a φ value and an R value only once after initiation of driving the brushless motor 1; or may determine a φ value and an R value when a change has arisen in status such as a temperature. Moreover, the threshold values and inequalities employed in the first through third computing methods may also use different values or conditional equations.

Next, the second embodiment is based on the premise that the R computing section 28 substitutes the d-axis detection current $i_d$ and the q-axis detection current $i_q$ into the d-axis command current $i_d^*$ and the q-axis command current $i_q^*$ of Eq. (2) and solves the equation with regard to R. However, another conceivable method is to substitute the d-axis detection current $i_d$ and the q-axis detection current $i_q$ into the d-axis command current $i_d^*$ and the q-axis command current $i_q^*$ of Eq. (1) and to solve the equation with regard to R. As a result, an R value can be accurately computed without being affected by a $\phi$ value.

Specifically, when $i_d \neq 0$ stands, the R computing section 28 may also determine armature winding resistance R including armature winding resistance included in Equation (1) from the d-axis command voltage $v_d$, the d-axis detection current $i_d$, the q-axis detection current $i_q$, and the angular velocity $\omega_e$, by use of Equation (12a) provided below.

$$R=(v_d-PL_d i_d+\omega_e L_q i_q)/i_d \quad (12a)$$

For the sake of simplifying computation, the R computing section 28 may also use Equation (12b) and (12c) provided below in lieu of Equation (12a).

$$R=(v_d+\omega_e L_q i_q)/i_d \quad (12b)$$

$$R=v_d/i_d \quad (12c)$$

Equation (12b) corresponds to Equation (12a) from which a differential term is omitted, and Equation (12c) corresponds to Equation (12b) from which terms including $i_q$ are omitted.

Since, in reality, the d-axis detection current $i_d$ does not usually contribute to generation of motor torque, there are many cases where the d-axis detection current $i_d$ is controlled so as to come to zero. In the modification, the d-axis detection current $i_d$ is controlled so as to assume a value differing from zero. Such control may also be performed at all times or temporarily performed when an R value is computed as mentioned above. Moreover, when so-called week flux control is performed, control is performed so as to cause the d-axis detection current $i_d$ to flow. Hence, the flux control is appropriate as a control scheme for the case where an R value is computed as mentioned above.

The R computing section 28 may also determine an R value at arbitrary timing and, for example, a predetermined time interval, so long as the above condition is fulfilled. The R value may also be determined only once after initiation of driving of the brushless motor 1, or the R value may also be determined when a change has arisen in a state, such as a temperature. Moreover, since an error is likely to arise in an R value determined when the q-axis detection current $i_q$ is close to zero, the R value may also be determined only when a predetermined threshold value or more is achieved. As mentioned previously, $L_d$ and $L_q$ included in Eq. (1) may also be determined from a command current, a detection current, or the like, through computation, and a single value may also be used for $L_d$ and $L_q$ (in the case of, for example, a cylindrical motor). Further, when a current sensor is normally operating, the motor controller of the third embodiment performs feedback control. When the current sensor is broken and when feedback control cannot be performed, the controller performs open loop control by use of the R value determined during the course of feedback control being performed, so that the brushless motor can be driven with high accuracy, to thus acquire a desired motor output.

Subsequently, in the second embodiment and modifications, there are cases where the R computing sections 28 and 48 cannot compute an R value even when the above condition is fulfilled. The reason for this is that only one current sensor 14 is provided and that a current cannot be detected when no difference exists among the command voltages $V_u$, $V_v$, and $V_w$ of three phases, as mentioned previously. However, since the R value changes because of heat generation induced by energization, correcting (computing) the R value at all times is desirable. When a correction is not made at all times, the R value is suddenly corrected at a point in time when a correction can be made. Therefore, torque variation achieved at that point in time becomes great. This especially poses a problem in motor control of an electric power steering system for which reduction of torque variation is desirable.

Therefore, in order to correct (compute) an R value at all times, when detection of a current is possible, the R computing section (not shown) of the present modification computes an R value as in the second embodiment and the previously-described modifications. When detection of a current is impossible, an R value is computed from the d-axis command current $i_d^*$ and the q-axis command current $i_q^*$ received from the open loop control section 22. Specifically, $(i_d^{*2}+i_q^{*2})$ is computed, and a result of computation is multiplied by a temperature coefficient of copper, thereby computing a calorific, i.e., temperature dependent, value. An R value is computed from the amount of temperature rise obtained by subtracting predetermined heat release from the calorific value. Thus, even when an electric current cannot be detected, an R value can be corrected at all times, and hence the torque variations can be reduced.

Computation of the amount of temperature rise for the case where a current cannot be detected and computation of an R value for correction purpose may also typically be performed once even when a current is detectable. The R value for correction acquired at that time is compared with the (correct) R value acquired by means of the computing methods of the second embodiment and the previously-described modifications. As a result, so long as a correction value for correcting an individual difference of each system is computed, a more accurate R value can be computed by use of the correction value for computation when detection of a current is impossible.

The amount of temperature rise may also be determined by means of an experiment or simulation, and an R value may also be computed by means of an approximation expression previously determined in connection with $(i_d^{*2}+i_q^{*2})$ The R value may also be computed on a per-phase basis in accordance with a command current of each phase. Moreover, in a case where there is an area where a current cannot be detected even when current sensor 14 is provided in numbers, an R value may also be computed. Alternatively, there may also be a configuration in which an R value is computed from the d-axis command current $i_d^*$ and the q-axis command current $i_q^*$ when the current sensor 14 is broken regardless of the number of current sensors 14.

Next, by means of taking the vehicle velocity S as a parameter and making a reference to an assist map storing correspondence between steering torque T and command currents, the command current computing section 21 of each of the embodiments determines a command current. The command current in this assist map is computed by means of dividing steering torque T (exclusive of a predetermined dead zone and a saturation region) by a torque constant Kt of a motor previously determined at the time of preparation of the assist map. However, the torque constant Kt involves an individual difference unique to each system and changes according to a temperature change. Therefore, there are cases where assist torque required for a command current is not acquired, and control sometimes becomes unstable for that reasons.

In a synchronous motor, the torque constant Kt is equal to the number of armature winding flux linkages φ, and hence the command current computing section 21 computes a command current from the current torque constant Kt' [Nm/A] obtained by subjecting φ [Wb] computed by the φ computing section 26 of the first embodiment to dimensional conversion. At this point, the command current computing section 21 acts as dimension conversion section and command current value computing section. Specifically, the command current computing section 21 computes a value (Kt'/Kt) that is obtained by dividing the current torque constant Kt' by the torque constant Kt previously determined at the time of preparation of an assist map; and divides the command current determined by reference to the assist map by the value (Kt'/Kt). As a result, a command current equal to the command current that is to be obtained when the assist map is prepared on the basis of the current torque constant Kt' can be obtained, and hence stable control can be performed even when a change has arisen in temperature.

In place of the above configuration using the assist map, the command current computing section 21 may also determine a command torque Ta by means of taking the vehicle velocity S as a parameter and making reference to an assist torque map storing correspondence between the steering torque T and command torques Ta; and may take, as a command current, a value determined by dividing the command torque Ta by the current torque constant Kt' based on φ computed by the φ computing section 26. As a result, a command current can be obtained from the current torque constant Kt', and hence stable control can be performed even when a change has arisen in temperature.

The current torque constant Kt' may also be determined at arbitrary timing; for example, a predetermined time interval, as mentioned previously or when a change has arisen in a state, such as a temperature. Moreover, the configuration for computing the current torque constant Kt' is not limited to motor control performed in the electric power steering system and can be widely used for overall motor control involving torque control.

Subsequently, in the first and second embodiments, the current sensor 14 is provided between the motor drive circuit 13 and the negative side (ground) of the power source, as shown in FIGS. 2 and 4. Therefore, there is a voltage applied to a shunt resistor or a wiring resistor in the current sensor 14, and the source voltage does not act, in unmodified form, as a voltage to be applied to the motor. Consequently, a portion of the source voltage actually applied to the motor is a voltage that serves as a reference for determining a duty ratio of a PWM signal, and the voltage must be accurately acquired. In the modification, there is provided a voltage detection unit (a voltage sensor or the like) for detecting a portion of the source voltage actually applied to the motor, whereby a voltage serving as a reference for determining a duty ratio of the PWM signal can be accurately acquired. Hence, accurate control can be performed stably. The same also applies to a case where the current sensor 14 is interposed between the motor drive circuit 13 and the positive side of the power source. Accordingly, in the present modification, a voltage sensor 16 is newly provided for measuring a voltage across the motor drive circuit 13.

A u-phase command duty ratio Du, a v-phase command duty ratio Dv, and a w-phase command duty ratio Dw are determined from the detected voltage Vb across the motor drive circuit 13 and the respective phase command voltages $V_u$, $V_v$, and $V_w$ by use of Equations (13) to (15) provided below. In the following equations, a duty ratio of 100% is expressed as one.

$$Du = Vu/Vb + 0.5 \quad (13)$$

$$Dv = Vv/Vb + 0.5 \quad (14)$$

$$Dw = Vw/Vb + 0.5 \quad (15)$$

Figure 8:
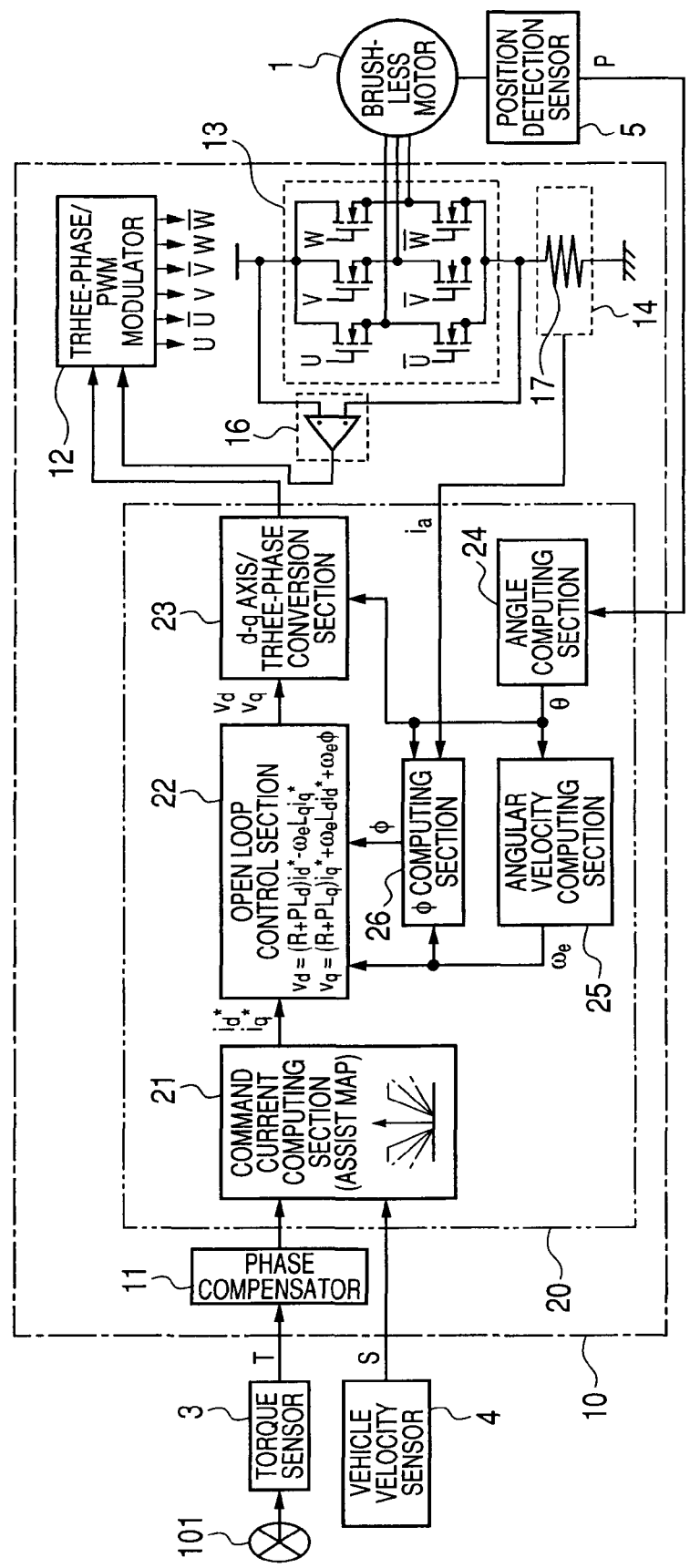
FIG. 8 is a block diagram showing an example configuration of the motor controller including the voltage sensor of the modification of the present invention.

FIG. 8 is a block diagram showing an example configuration of a motor controller including the voltage sensor 16 of the modification. The motor controller of the present modification corresponds to the motor controller of the first embodiment that is newly provided with the voltage sensor 16. Elements which are the same as those of the previously-described embodiments are assigned the same reference numerals, and their explanations are omitted. The shunt resistor 17 included in the current sensor 14 is important in the present modification and, hence, illustrated particularly.

As is understood by making a reference to FIG. 8, the voltage sensor 16 of the present modification includes a differential amplifier. One of input terminals of the voltage sensor 16 is connected between the motor drive circuit 13 and the positive side of the power source, and the other of the input terminals is connected between the motor drive circuit 13 and the shunt resistor 17. An output of the voltage sensor 16 is connected to a three-phase/PWM modulator 12. As a result of the voltage sensor 16 being provided as mentioned above, the voltage applied to the motor drive circuit 13 can be accurately detected. Hence, a voltage serving as a reference for determining a duty ratio of a PWM signal can be accurately detected without being affected by a wiring resistor or the like.

In FIG. 8, one end of the shunt resistor 17 is connected to the negative side (ground) of the power source. However, the one end may also be connected to the positive side of the power source. In this case, one of the input terminals of the voltage sensor 16 is connected between the motor drive circuit 13 and the shunt resistor 17.

Moreover, the voltage detection unit for detecting a source voltage mentioned in connection with the modification can also be said to be a modification of the voltage sensor 16. One of the input terminals of the voltage sensor 16 may also be connected to the positive side of the power source, and the other input terminal may also be connected to the negative side of the power source. In this configuration, the voltage applied to the motor drive circuit 13 cannot be detected immediately, and duty ratios of PWM signals of respective phases generated by the three-phase/PWM modulator 12 are acquired. The amount of drop in motor-applied voltage to the source voltage is consecutively computed from the duty ratios for each PWM period. Although computation load is imposed on the voltage, the voltage applied to the motor drive circuit 13 can be accurately detected (computed).

As mentioned above, the essential requirement for the voltage sensor 16 is to measure at least a voltage between a point on a path from one end of the motor drive circuit 13 to the positive side of the power source and another point on a path from the other end of the motor drive circuit 13 to the negative side of the power source.

What is claimed is:

1. A motor controller for driving a motor comprising:
   a control unit for determining a level of a command voltage used for driving the motor;
   a motor drive unit for driving the motor by use of a voltage having the level determined by the control unit;

a current detection unit for detecting an electric current flowing into the motor; and a parameter computing section which determines, from a current value detected by the current detection unit, a parameter used when the level of the command voltage is determined, wherein the control unit includes an open loop control section which determines the level of the command voltage, from a command current value showing an amount of electric current to be supplied to the motor and angular velocity of a rotor of the motor, in accordance with a motor circuit equation; and the parameter computing section determines, from the current value detected by the current detection unit, a parameter included in the motor circuit equation.

2. The motor controller according to claim 1, wherein the parameter computing section determines, from the current value detected by the current detection unit, a number of armature winding flux linkages included in the motor circuit equation.

3. The motor controller according to claim 1, wherein the parameter computing section determines, from the current value detected by the current detection unit, armature winding resistance included in the motor circuit equation.

4. The motor controller according to claim 3, wherein the parameter computing section determines a d-axis current detection value of a d-q coordinate system from a current value detected by the current detection unit, and determines the circuit resistance including the armature winding resistance from the d-axis current detection value when the determined d-axis current detection value is not zero.

5. The motor controller according to claim 1, wherein the parameter computing section determines, from a current value detected by the current detection unit, a number of armature winding flux linkages included in a motor circuit equation when influence of a change in circuit resistance including armature winding resistance included in the motor circuit equation is negligible and the circuit resistance including the armature winding resistance when influence of a change in the number of armature winding flux linkages is negligible.

6. The motor controller according to claim 1, wherein the control unit includes a command current value computing section for determining a command current value showing an amount of current to be supplied to the motor; and the parameter computing section determines a temperature dependent value from the command current value determined by the command current value computing section when the current detection unit does not detect any current value, and determines circuit resistance including armature winding resistance included in the motor circuit equation from the determined calorific value.

7. The motor controller according to claim 1, wherein the motor drive unit includes a switching circuit that has a plurality of switching elements and that supplies the motor with a current; and only a single current detection unit is provided, wherein the current detection unit is provided between the switching circuit and the power source.

8. An electric power steering system having the motor controller defined in claim 1.

9. A motor controller for driving a motor comprising:
a control unit for determining a level of a command voltage used for driving the motor;
a motor drive unit for driving the motor by use of a voltage having the level determined by the control unit;
a current detection unit for detecting an electric current flowing into the motor; and
a parameter computing section which determines, from a current value detected by the current detection unit, a parameter used when the level of the command voltage is determined,
wherein the control unit further includes
a feedback control section which subjects a difference between the command current value and the current value detected by the current detection unit to proportional integration, thereby determining a level of the command voltage; and
a command voltage selection section for outputting, in a switching manner, the level of the command voltage determined by the feedback control section and the level of the command voltage determined by the open loop control section.

10. The motor controller according to claim 9, wherein the command voltage selection section outputs the level of the command voltage determined by the feedback control section when the current detection unit is operating normally and which outputs the level of the command voltage determined by the open loop control section when the current detection unit has become broken; and the parameter computing section determines a parameter included in the motor circuit equation in a period during which the current detection unit is operating normally.

11. A motor controller for driving a motor comprising:
a control unit for determining a level of a command voltage used for driving the motor;
a motor drive unit for driving the motor by use of a voltage having the level determined by the control unit;
a current detection unit for detecting an electric current flowing into the motor; and
a parameter computing section which determines, from a current value detected by the current detection unit, a parameter used when the level of the command voltage is determined, wherein the parameter computing section determines, from the current value detected by the current detection unit, a number of armature winding flux linkages included in the motor circuit equation,
wherein the control unit comprises
a dimension conversion section for computing a current torque constant by means of dimensionally converting the number of armature winding flux linkages determined by the parameter computing section; and
a command current value computing section that receives the current torque constant from the dimensional conversion section and that determines a command current value showing an amount of electric current supplied to the motor equivalent to a value determined by dividing a torque, which serves as a target torque to arise in the motor, by the current torque constant.

12. A motor controller for driving a motor comprising:
a control unit for determining a level of a command voltage used for driving the motor;
a motor drive unit for driving the motor by use of a voltage having the level determined by the control unit;
a current detection unit for detecting an electric current flowing into the motor; and
a parameter computing section which determines, from a current value detected by the current detection unit, a parameter used when the level of the command voltage is determined,
further comprising:
a voltage detection unit for detecting a voltage corresponding to the voltage applied to the motor, wherein the motor drive unit comprises
a switching circuit that has a plurality of switching elements and that supplies the motor with a current as a result of the plurality of switching elements being turning on or off; and
a motor voltage determination section that turns on or off the plurality of switching elements by use of a voltage of the level determined by the control unit and a voltage detected by the voltage detection unit, wherein
the voltage detection unit measures a voltage between a point on a path from one end of the switching circuit connected to a positive side of a power source for driving the motor to the positive side of the power source and another point on a path from the other end of the switching circuit, which is connected to the negative side of the power source, to the negative side of the power source.

* * * * *